United States Patent [19]

Insalaco

[11] 3,896,587
[45] July 29, 1975

[54] NURSERY POT HAVING IMPROVED DRAINAGE

[76] Inventor: Charles J. Insalaco, Pigeon Swamp Rd., South Windham, Conn. 06266

[22] Filed: June 25, 1973

[21] Appl. No.: 373,451

[52] U.S. Cl. .................................. 47/34; D35/3 R
[51] Int. Cl. ............................................. A01g 9/02
[58] Field of Search ............ 47/34, 34.1, 34.2, 34.3, 47/34.7, 35, 38, 38.1; D35/3 R

[56] References Cited
UNITED STATES PATENTS

| | | | |
|---|---|---|---|
| 579,993 | 4/1897 | Mahler | 47/34 |
| 1,631,802 | 6/1927 | Evert | 47/34 |
| 2,075,186 | 3/1937 | Ellis | 47/34 |
| 2,253,817 | 8/1941 | Simmons | 47/34 |
| 2,810,234 | 10/1957 | Blackburn et al | 47/38 UX |
| 2,814,427 | 11/1957 | Emery | 47/34 X |
| 3,009,603 | 11/1961 | Stockdale | 47/34 X |
| 3,027,684 | 4/1962 | Keiding | 47/34 |
| 3,395,486 | 8/1968 | Campbell et al | 47/34 |
| 3,785,088 | 1/1974 | Guarriello | 47/34 |
| 3,800,469 | 4/1974 | Lau | 47/34 |
| D207,174 | 3/1967 | Rowbottam | D35/3 |

FOREIGN PATENTS OR APPLICATIONS

| | | | |
|---|---|---|---|
| 1,561,341 | 3/1969 | France | 47/37 |
| 859,964 | 1/1961 | United Kingdom | 47/34.1 |

Primary Examiner—Edgar S. Burr
Assistant Examiner—Steven A. Bratlie
Attorney, Agent, or Firm—Donald F. Bradley

[57] ABSTRACT

A nursery pot for use in growing, transporting and displaying plants or other flora is formed from a low density plastic material and is constructed to permit proper drainage of irrigating water and to prevent the formation of water spores particularly in the bottom thereof. The pot is characterized by a ridge about three-fourth inch from the bottom called a shadow block and impact shelf which both shades the drainage holes from direct sun, thus discouraging fungus growth, and also provides a shock absorber to protect the drainage holes from splitting as a result of abusive handling. The junction between the sidewalls and the bottom forms a smooth curve and contains four circumferentially spaced drainage holes, each hole encompassing a portion of the sidewall and extending partially into the bottom of the pot. The bottom of the pot includes a raised dome portion of sufficient diameter to cause excess irrigating water to drain from the center of the pot toward the drainage holes. The ports are color coded for efficient nursery management. The use of light color pots reduces destructive heat buildup within the pots.

8 Claims, 4 Drawing Figures

PATENTED JUL 29 1975          3,896,587

SHEET 1

NURSERY POT HAVING IMPROVED DRAINAGE

BACKGROUND OF THE INVENTION

1. Field of the Invention

This invention relates to an improved nursery pot for plants, and particularly to a nursery pot providing improved drainage of irrigating water and improved resistance to soil medium compaction. The pot is constructed from a plastic material and has improved resistance to splitting caused by rough handling.

2. Description of the Prior Art

Conventional nursery pots contribute substantially to the formation of water spores or other fungi in the stock due to the poor drainage provided by the pots which leads to soil compaction at the bottom of the pot. The design of prior art pots also permits irrigating water to be trapped at various locations within the pot. For example, the typical nursery pot is configured to have sidewalls of right cylindrical, truncated conic or truncated pyramidal sections with its base or bottom attached at substantially right angles to the sidewalls. The pots normally have irrigating holes in the sidewalls adjacent the bottom, while some pots also have holes in the bottom. Irrigating water has a tendency to become trapped in the corner between the sidewalls and the bottom, the water becoming stagnant and allowing fungi to form.

A further disadvantage of prior nursery pots is the flat bottom which allows compaction of the medium at the bottom where the roots of the plant are bunched, thereby also permitting the entrapment of dead water and creating a suction to the detriment of the stock. Proper drainage through the bottom partially alleviates the water entrapment problem, but does not prevent compaction of the medium.

The drainage holes in the sidewalls of typical nursery pots are situated so that the rays of the sun are permitted to strike the medium through the holes, thereby leading to a further possible source of fungus infection.

The interior of many nursery pots is rough or contains numerous indentations, corners and/or pockets into which water may be trapped and which are detrimental to proper drainage.

Nursery pots are often exposed to rough handling during shipment and have a tendency to split or crack due to the prevalence of sharp corners and the lack of impact resistance of the pots.

SUMMARY OF THE INVENTION

The present invention overcomes the deficiencies in the prior art nursery pots and provides an improved nursery pot which reduces the incidence of spore or fungus infection, enhances the drainage therethrough of irrigating water, and is both flexible and shock absorbent in order to prevent splitting.

In accordance with a preferred embodiment of the present nursery pot, the pot is constructed from a low density, high impact resistant plastic such as polyethylene. The sidewalls of the pot are preferably slightly conical and terminate at the bottom in a slightly indented reduced diameter shadow block and impact shelf with the junction between the sidewalls and the bottom being curved to enhance movement of water therethrough. A plurality of drainage holes, generally quadilateral in shape and with rounded corners, are circumferentially spaced about the pot at the junction of the sidewalls with the bottom, the holes extending partially up the sides of the pot and a short distance along the bottom.

A raised dome is situated in the bottom of the pot, the edges of the raised dome being rounded or sloped to enhance the flow of irrigating water away from the center of the pot and toward the circumferentially located drainage holes. The bottom portion of the pot below the shadow block and shelf is flexible to prevent splitting due to rough handling.

The top of the pot contains a plurality of circumferentially spaced vertical ribs along the outside to stiffen the pot and to permit easy stacking of pots, the air spaces between the ribs permitting stacked pots to be separated easily.

A semi-rigid lip portion extends circumferentially about the top edge of the pot, the lip portion being reinforced to enhance rigidity of the pot and handling thereof, particularly when the pot is lifted by the lip. This lip portion also protects the fingers from injury when handling the pots.

The inside walls of the pot are smooth to provide proper drainage of irrigating water therethrough and to prevent fungus spores from collecting.

The shadow block and impact shelf acts as a shield to prevent the rays of the sun from striking the medium through the draingage holes and thus to prevent the formation of fungus from this source.

Because the pots are molded from plastic, the pots may be made in many colors. As an additional feature of the present invention, the pots are color coded, that is, the pots are constructed in 10 different colors. One advantage of color is that it allows for the most efficient management and handling of nursery stock by eliminating confusion about varieties which have a similar appearance. Unskilled nursery labor and customers can identify stock by the color of the container. Additionally, light heat-resistant colors such as white, light blue, silver and yellow reflect the sun and prevent destructive heat buildup inside the pots. Soil temperatures can be reduced by as much as 10°–15°. Orange pots have been found to resist the infestation of aphids. Labeling of the pots can be eliminated by color coding different species or ages of plants, thereby eliminating an expense of nursery management and reducing handling time. Color also enhances sales and marketing of plants at the retail level.

Conventional drainage holes in the sides and/or bottom of the pot may be added for specific applications without adversely affecting the unique features of the present nursery pot.

Other features and advantages of the present invention are described in the accompanying drawings and description of the preferred embodiment.

DESCRIPTION OF THE PREFERRED EMBODIMENT

Figure 2:
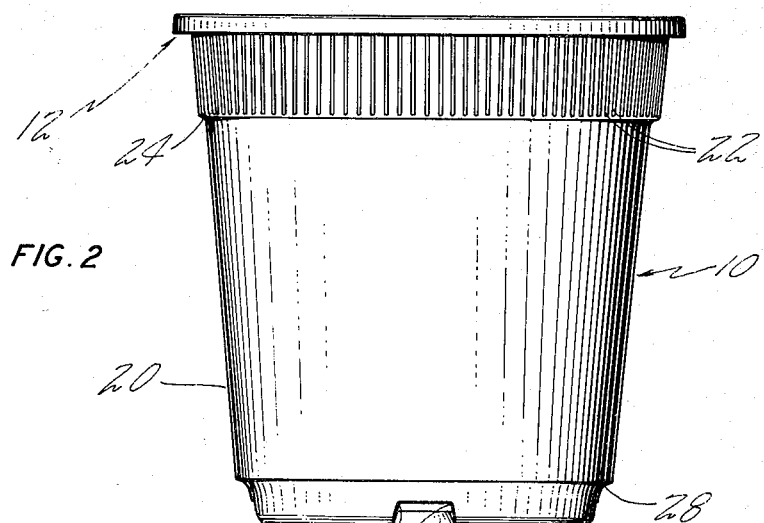
FIG. 2 is a front elevation thereof.
Figure 3:
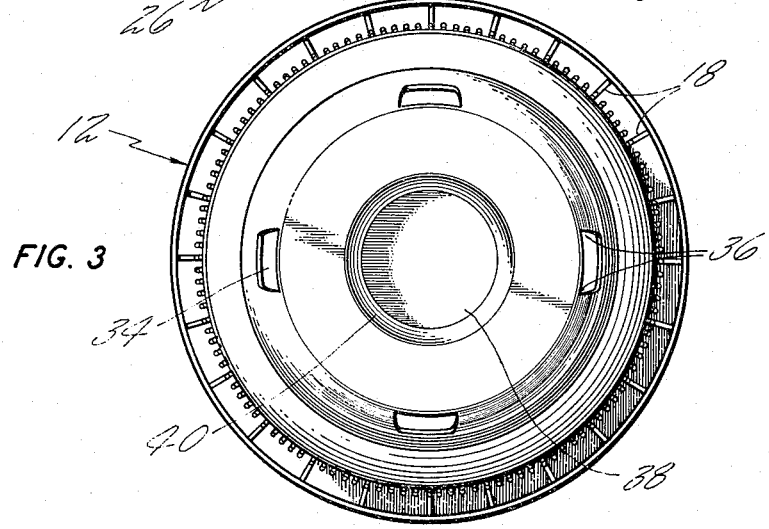
FIG. 3 is a bottom view thereof.

Referring particularly to FIG. 2, there is shown in elevation the improved nursery pot 10 of the present invention. The pot is preferably composed of a plastic material such as polyethelene which may be molded from dies and which may easily be formed in different colors. A wall thickness of about 0.055 inch is representative, and provides the required strength and rigidity while at the same time permitting a flexibility so that the pot may be deformed or bent during use or in shipment without adverse effects.

Figure 1:
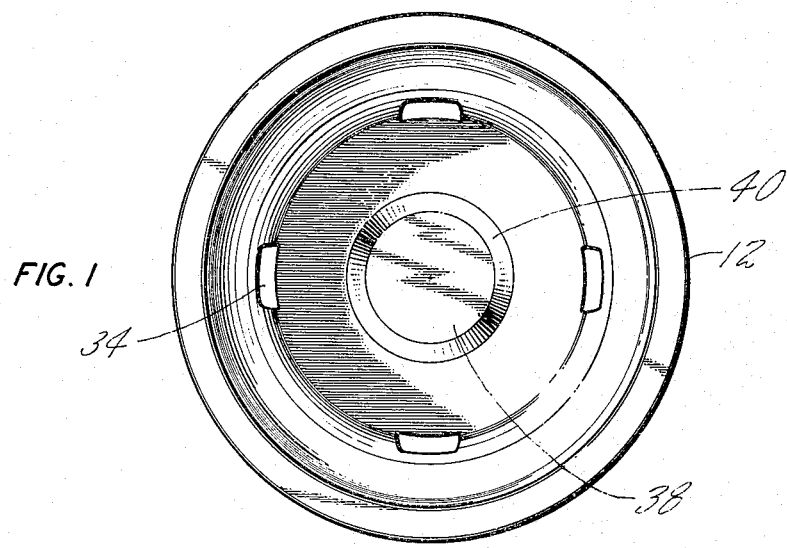
FIG. 1 is a top view of the improved nursery pot.
Figure 4:
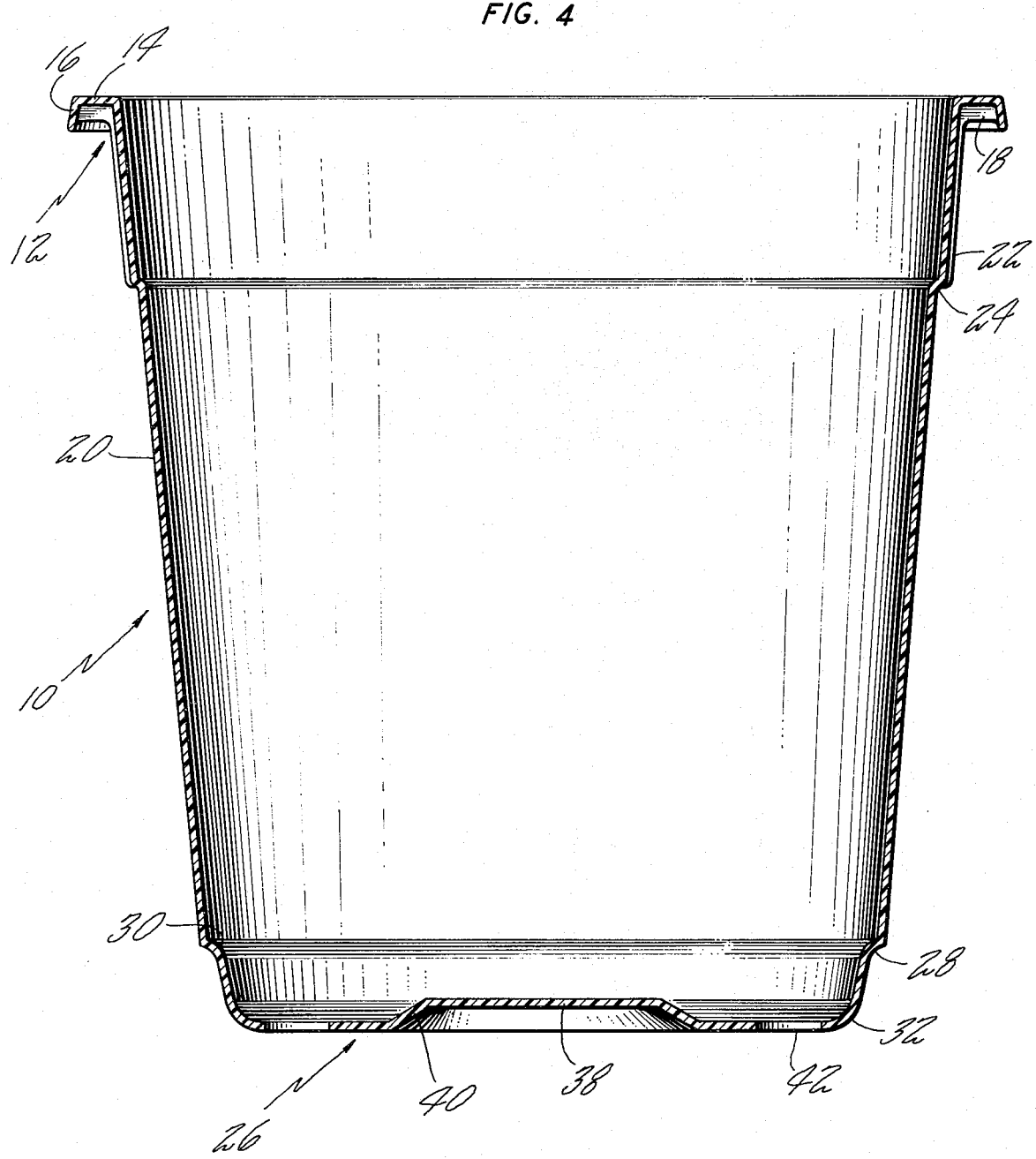
FIG. 4 is a sectional view thereof showing additional features of the invention.

As may be seen best in FIGS. 1 and 4, the top portion of the pot has integrally attached thereto a circumferentially extending lip 12 which includes a horizontal extension 14 and a generally vertical extension 16. The lip 12 is strengthened by means of a plurality of support tabs 18 which join both the horizontal and vertical portions 14 and 16 of lip 12 with sidewall 20. The integral construction of the lip 12 with the sidewall 20 and the inclusion of tabs 18 provide strength and rigidity when a heavy pot is picked up by means of the lip 12. The lip 12 also aids in separating stacked pots by providing a convenient extension for grasping and pulling a pot from the stack.

Extending vertically along the outside of wall 20 are a plurality of ribs 22, typically (for a 2 quart pot) 180 ribs approximately 1¾ inches long, one thirty-second inch wide and one thirty-second inch deep. The ribs 22 provide vertical strength to the pot and assist in separating stacked pots by providing spaces between adjacent ribs so that binding of the stacked pots is less likely to occur.

At the bottom of ribs 22 the wall 20 curves slightly inward forming a small inverted ledge or shelf 24. The inside of the wall 20 adjacent ledge 24 forms a smooth curved surface for assisting the run-off of irrigating water from the inside wall.

The sidewall 20 extends from ledge 24 almost vertically downward until at approximately three-fourths inch above the bottom 26 of the pot a second ledge or shelf 28 occurs. The shelf 28 will be referred to as the shadow block and impact shelf for reasons which will become apparent. The inside wall adjacent the shelf 28 also forms a smooth curve as shown at 30 to enhance proper drainage along the walls.

The junction of the sidewall 20 with the bottom 26 is a smooth curve of large radius as shown at 32 to prevent water from becoming trapped in a corner and stagnating to the detriment of the stock. A plurality of drainage holes or ports 34 are formed at the curved junction 32 of the wall 20 and bottom 26, the holes 34 typically extending about 1 inch in the horizontal direction and about three-eighths inch in the vertical direction for a pot with dimensions as previously described. The corners 36 of each of the drainage holes 34 are curved as opposed to sharp angles to prevent splitting of the pot at the corners upon impact. The drainage holes are coextensive with the curved corner portion 32, extending partially along the sidewall 20 and partially along the bottom 26. The exact size and precise extent of the holes 34 along the sidewall 20 and bottom 26 may be varied, as may the shape and number of drainage holes, depending on the particular requirements of a nursery, the type of stock, etc. It has, however, been found that drainage is enhanced and fungus formation reduced by providing a curved surface 32 at the junction of the wall 20 and bottom 26, and by locating the drainage holes 34 coincident with the curved surface 32 so that drainage occurs from both the sidewalls 20 and the bottom 26 through the drainage holes, thereby requiring that the drainage holes extend at least partially into the bottom 26.

The provision of the shadow shelf 28 and the reduced diameter of the pot below the shadow shelf 28 also serves two other important functions. First, the drainage holes 34 and the medium within the pot exposed therethrough are not directly exposed to the rays of the sun. As may be seen by reference to the Figures, the drainage holes 34 are shielded by the shelf 28 so that the direct rays of the sun cannot strike the exposed drain holes and cause fungi to build up, clogging the holes and preventing proper water drainage. Only when the sun is low in the sky, at sunrise and toward dusk, will the holes 34 by directly illuminated, and at these times the sun is at a reduced intensity. The occurrence of fungi and/or spores is thereby considerably reduced.

Second, the reduced diameter portion of the pot below the shelf 28 has no sharp corners and is relatively flexible, thus better absorbing shocks induced when the pot is dropped or otherwise forcefully contacts a surface as commonly occurs during handling and/or transport of nursery stock. The shelf 28 also assists in absorbing vertical impacts.

Another unique feature of the nursery pot is the raised dome portion 38 which is integral with and joined to the bottom 26 by circumferentially extending and gradually sloping walls 40. It has been found that the compaction of the medium at the bottom of nursery pots is a main cause of disease, the compacted medium being more dense and causing water to be trapped adjacent the main root structure. A suction has been found to occur at this part of the medium which inhibits proper drainage. The raised dome 38 prevents compaction, and aids in moving water rapidly to the drainage holes, while the sloping wall 40 of the dome 38 serves to drain water from the center of the pot toward the drainage holes 34.

Additional drainage holes 42 may be provided in the bottom 26 as required for special situations, and side drainage holes may also be used.

The nursery pot of this invention has been found to be particularly useful in helping to prevent the fungus diseases phytophthora cinnamomi and rhizoctonia in rhododendren. These fungi as well as others have caused massive losses in the container nursery trade throughout the United States and Europe. The first signs of these fungi are a pale yellow-green coloring of leaves which then wither completely. The roots and bases of the stems become more or less brown and decayed. The optimum temperature for these fungi is between 70° and 85°F. Hence, the coloring of the pots in a light color such as white, yellow, light blue or silver prevents heat buildup in the pot. This reduces the risk of fungi infestation and root injury. The improved drainage provided by the pot is also instrumental in providing protection from disease.

While the present invention has been described with respect to its preferred embodiment, it is apparent that modifications and changes in the precise form thereof may be made without departing from the scope of the invention as hereinafter claimed.

I claim:

1. An open topped plastic nursery pot of circular cross section having a substantially vertical sidewall which is tapered slightly from the top thereof so that the top of said pot is of slightly larger horizontal cross section than is the lower portion thereof in order to permit convenient stacking of a plurality of said pots, a bottom portion of reduced diameter from the remainder of said pot, said bottom portion having a horizontally extending base member and a wall member joining said base member to the lowermost extension of said sidewall, said wall member being shaped so as to be concave with respect to the centerline of the pot adjacent said base member and convex with respect to the centerline of the pot adjacent said sidewall, a plurality of drainage holes circumferentially spaced about the bottom portion of said pot coextensive with the concave portion of said wall member, said drainage holes extending partially into said wall member above the concave portion thereof and partially into said base member, each of said drainage holes being substantially quadrilateral in shape, the shape of said wall member, and said drainage holes, rendering said bottom portion more readily flexible than the remainder of said pot, the center portion of said base member being slightly elevated and extending a short distance into the inside of said pot with respect to the radially outer portion of said base member to form a circular dome which is joined to the radially outer portion of said base member by an outwardly sloping circumferential wall, the junction between the lowermost extension of said sidewall and the convex portion of said wall member forming a circumferential fillet which overhangs said drainage holes and shields said drainage holes from direct sunlight during the time of the day when the sun is near its zenith.

2. A nursery pot as in claim 1 and including a plurality of narrow, vertically extending ribs located about the outside of said pot on the sidewall thereof and extending from immediately adjacent the top of the pot to a point approximately between one-third and one-fourth of the vertical height of said pot.

3. A nursery pot as in claim 2 in which there is formed at the bottommost point of said ribs a second circumferential fillet in the sidewall of said pot.

4. A nursery pot as in claim 1 and including a circumferential lip portion extending horizontally from and in the plane defined by the topmost extension of said sidewall, a short ring shaped member extending vertically downward from the outermost periphery of said circumferential lip portion, and a plurality of circumferentially spaced support tabs joining the lip portion and the ring shaped member.

5. A nursery pot as in claim 1 in which said pot is constructed from polyethylene of a thickness of 0.055 inch.

6. A nursery pot as in claim 1 in which said circumferential fillet is approximately 0.75 inch above said base member.

7. A nursery pot as in claim 1 in which the plurality of drainage holes consists of four trapezoidal shaped drainage holes evenly spaced about the circumference of said pot, the corners of said drainage holes being rounded to reduce splitting of said pot.

8. A nursery pot as in claim 7 in which said trapezoidal shaped drainage holes extend about 1 inch in the horizontal direction and about three-eighths inch in the vertical direction.

* * * * *